(12) United States Patent
Aldrich et al.

(10) Patent No.: US 11,400,502 B2
(45) Date of Patent: Aug. 2, 2022

(54) EDGE LEVELER WITH OFFSET ROLLERS

(71) Applicant: FuelCell Energy, Inc., Danbury, CT (US)

(72) Inventors: Benjamin Aldrich, Bethlehem, CT (US); Carson Payne, Canton, CT (US); Steve Rulli, Winsted, CT (US); Marc Gizzie, Winsted, CT (US); Steve Ayres, Waterbury, CT (US)

(73) Assignee: FuelCell Energy, Inc., Danbury, CT (US)

( * ) Notice: Subject to any disclaimer, the term of this patent is extended or adjusted under 35 U.S.C. 154(b) by 184 days.

(21) Appl. No.: 16/564,730

(22) Filed: Sep. 9, 2019

(65) Prior Publication Data

US 2020/0086370 A1    Mar. 19, 2020

Related U.S. Application Data

(60) Provisional application No. 62/730,870, filed on Sep. 13, 2018.

(51) Int. Cl.
*B21D 1/02* (2006.01)
(52) U.S. Cl.
CPC ...................................... *B21D 1/02* (2013.01)
(58) Field of Classification Search
CPC ... B21D 1/02; B21D 3/02; B21D 3/05; B21D 3/04; B21D 5/14; B21D 1/06
USPC ............................................ 72/160, 162–165
See application file for complete search history.

(56) References Cited

U.S. PATENT DOCUMENTS

| | | | |
|---|---|---|---|
| 3,006,401 A * | 10/1961 | Jamesn | B21D 1/02 72/162 |
| 3,032,245 A | 5/1962 | George et al. | |
| 3,545,243 A * | 12/1970 | Fritz | B21D 1/05 72/160 |
| 3,595,277 A | 7/1971 | Lefever | |
| 4,033,165 A * | 7/1977 | Arimura | B21B 37/28 72/205 |
| 4,635,458 A * | 1/1987 | Bradlee | B21D 1/02 72/163 |
| 4,918,797 A * | 4/1990 | Watkins | E04D 3/364 29/243.5 |
| 5,554,235 A | 9/1996 | Noe et al. | |
| 6,892,561 B2 * | 5/2005 | Grell | B21D 1/05 72/160 |

(Continued)

FOREIGN PATENT DOCUMENTS

| | | | | |
|---|---|---|---|---|
| CN | 104668313 A | * | 6/2015 | ............... B21D 1/02 |
| CN | 108262376 A | * | 7/2018 | ............... B21D 3/12 |

(Continued)

*Primary Examiner* — Gregory D Swiatocha
*Assistant Examiner* — Bobby Yeonjin Kim
(74) *Attorney, Agent, or Firm* — Foley & Lardner LLP

(57) ABSTRACT

An edge leveler for leveling an edge of a plate includes a first frame, a plurality of first rollers rotatably mounted along the first frame; a second frame, and a plurality of second rollers rotatably mounted along the second frame. The second rollers are offset relative to the first rollers. A width of a gap between an adjacent pair of first and second rollers on a first end portion of the edge leveler is greater than a width of a gap between an adjacent pair of first and second rollers in a middle portion of the edge leveler.

19 Claims, 12 Drawing Sheets

(56) References Cited

U.S. PATENT DOCUMENTS

| | | | | |
|---|---|---|---|---|
| 2001/0008719 A1* | 7/2001 | Ikeda | ................ | H01M 8/0228 |
| | | | | 72/196 |
| 2007/0044531 A1* | 3/2007 | Liefer | ................ | B21D 1/02 |
| | | | | 72/160 |
| 2015/0013418 A1* | 1/2015 | Abe | ................ | B21D 1/06 |
| | | | | 72/163 |
| 2015/0128675 A1* | 5/2015 | Abe | ................ | B21B 35/00 |
| | | | | 72/160 |

FOREIGN PATENT DOCUMENTS

| | | | | |
|---|---|---|---|---|
| DE | 202007013550 U1 * | 12/2007 | ............ | B21D 1/02 |
| JP | 55130338 A * | 10/1980 | | |
| JP | 62187523 A * | 8/1987 | | |
| KR | 20100096899 A * | 9/2010 | ............ | B21D 1/02 |

\* cited by examiner

1100

```
┌─────────────────────────────────────────────────┐
│ PROVIDING AN EDGE LEVELER INCLUDING A FIRST     │
│ FRAME, A PLURALITY OF FIRST ROLLERS ROTATABLY   │
│ MOUNTED ALONG THE FIRST FRAME, A SECOND FRAME,  │
│ AND A PLURALITY OF SECOND ROLLERS ROTATABLY     │
│ MOUNTED ALONG THE SECOND FRAME.                 │
│                      1101                        │
└─────────────────────────────────────────────────┘
                        │
┌─────────────────────────────────────────────────┐
│      LEVELING AN EDGE OF THE BIPOLAR PLATE      │
│               USING THE EDGE LEVELER             │
│                      1103                        │
└─────────────────────────────────────────────────┘
```

*FIG. 10*

EDGE LEVELER WITH OFFSET ROLLERS

CROSS REFERENCE TO RELATED PATENT APPLICATION

The present application claims the benefit of and priority to U.S. Provisional Application No. 62/730,870, filed Sep. 13, 2018, the entire disclosure of which is hereby incorporated by reference herein.

BACKGROUND

The present disclosure relates generally to the field of shaping devices, and more specifically to an edge leveler for removing bows in bipolar plates used in fuel cell stack assemblies.

Bipolar plates serve as the anode plate and the cathode plate in a fuel cell. Bipolar plates can account for a significant portion of a fuel cell stack's weight and cost. Functions performed by bipolar plates include inhibiting leakage of reactant gases or coolant from a fuel cell, distributing reaction gases uniformly over active areas of a fuel cell, removing heat from the active areas, and carrying current across multiple cells in a fuel cell stack.

SUMMARY

According to an exemplary embodiment of the present disclosure, an edge leveler for leveling an edge of a plate includes a first frame; a plurality of first rollers rotatably mounted along the first frame; a second frame; and a plurality of second rollers rotatably mounted along the second frame. The second rollers are offset relative to the first rollers. A width of a gap between an adjacent pair of first and second rollers on a first end portion of the edge leveler is greater than a width of a gap between an adjacent pair of first and second rollers in a middle portion of the edge leveler.

According to one aspect, a width of a gap between an adjacent pair of first and second rollers on a second end portion of the edge leveler is greater than the width of the gap between the adjacent pair of first and second rollers in the middle portion of the edge leveler.

According to another aspect, the width of the gap between the adjacent pair of first and second rollers on the second end portion of the edge leveler is adjustable.

According to another aspect, the width of the gap between the adjacent pair of first and second rollers on the second end portion of the edge leveler is adjustable via a set screw.

According to another aspect, the width of the gap between the adjacent pair of first and second rollers on the first end portion of the edge leveler is adjustable.

According to another aspect, the width of the gap between the adjacent pair of first and second rollers on the first end portion of the edge leveler is adjustable via a set screw.

According to another aspect, the edge leveler is configured to be mounted on a track.

According to another aspects, at least one of the first rollers and the second rollers is free spinning (i.e., not driven).

According to another aspect, a rotational speed of at least one of the first rollers and second rollers is controllable by a controller.

According to another exemplary embodiment of the present disclosure, a system for leveling an edge of a plate includes a track; and an edge leveler mounted on the track. The edge leveler includes a first frame; a plurality of first rollers rotatably mounted along the first frame; a second frame; and a plurality of second rollers rotatably mounted along the second frame. The second rollers are offset relative to the first rollers. A width of a gap between an adjacent pair of first and second rollers on a first end portion of the edge leveler is greater than a width of a gap between an adjacent pair of first and second rollers in a middle portion of the edge leveler.

According to one aspect of the system, a width of a gap between an adjacent pair of first and second rollers on a second end portion of the edge leveler is greater than the width of the gap between the adjacent pair of first and second rollers in the middle portion of the edge leveler.

According to another aspect of the system, the width of the gap between the adjacent pair of first and second rollers on the second end portion of the edge leveler is adjustable.

According to another aspect of the system, the width of the gap between the adjacent pair of first and second rollers on the second end portion of the edge leveler is adjustable via a set screw.

According to another aspect of the system, the width of the gap between the adjacent pair of first and second rollers on the first end portion of the edge leveler is adjustable.

According to another aspect of the system, the width of the gap between the adjacent pair of first and second rollers on the first end portion of the edge leveler is adjustable via a set screw.

According to another exemplary embodiment of the present disclosure, a method of shaping a bipolar plate for a fuel cell includes the steps of providing an edge leveler and leveling an edge of the bipolar plate using the edge leveler. The edge leveler includes a first frame; a plurality of first rollers rotatably mounted along the first frame; a second frame; and a plurality of second rollers rotatably mounted along the second frame. The second rollers are offset relative to the first rollers. A width of a gap between an adjacent pair of first and second rollers on a first end portion of the edge leveler is greater than a width of a gap between an adjacent pair of first and second rollers in a middle portion of the edge leveler.

According to one aspect of the method, a width of a gap between an adjacent pair of first and second rollers on a second end portion of the edge leveler is greater than the width of the gap between the adjacent pair of first and second rollers in the middle portion of the edge leveler.

According to another aspect of the method, the width of the gap between the adjacent pair of first and second rollers on the second end portion of the edge leveler is adjustable.

According to another aspect of the method, the width of the gap between the adjacent pair of first and second rollers on the second end portion of the edge leveler is adjustable via a set screw.

According to another aspect of the method, the width of the gap between the adjacent pair of first and second rollers on the first end portion of the edge leveler is adjustable.

According to another aspect of the method, the width of the gap between the adjacent pair of first and second rollers on the first end portion of the edge leveler is adjustable via a set screw.

According to another aspect of the method, the edge leveler is mounted on a track, and is moved along a length of the track during the step of leveling the edge of the bipolar plate.

According to another aspect of the method, the edge leveler is controlled by a controller to be automatically moved along a length of the track during the step of leveling the edge of the bipolar plate.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 10 is a process flowchart illustrating a method of flattening a bipolar plate for a fuel cell according to another exemplary embodiment of the present disclosure.

DETAILED DESCRIPTION

Bipolar plates are generally made of an inexpensive, lightweight material so as to minimize a cost or weight of the fuel cell and/or fuel cell stack. Because of the relatively light weight of the material, current processes for making bipolar plates, such as stamping and welding, tend to create a bow or warp in the plate which persists throughout the cell manufacturing process. Specifically, the bows or warps may be due to differential rates of cooling of a weld between two materials of dissimilar or variable thickness. Bowed or warped bipolar cells (e.g., non-flat bipolar cell packages and/or cambered stamped parts popping up into waves along the sealing surfaces) may result in stack gaps (e.g., stack corner gaps) within a fuel cell stack and in poorly distributed, non-uniform cell-to-cell contact surface area, which may cause an undesirable increase in cell resistance. Additionally, the bow or warps in the bipolar plates may make accurate application of various adhesives or other components difficult to achieve, especially in an automated assembly line environment.

Current approaches to controlling or preventing bows or warps in the bipolar plates include attempts to control a flatness of the stamped parts which are used to assemble a bipolar plate. Other approaches include balancing a material thickness of a bipolar plate to reduce welding-induced warping. Yet other approaches include performing a hemming operation to partially control the flatness of a bipolar plate. All of these prior approaches achieve only marginal flattening of the assembled bipolar plate and do not necessarily correct the bowing or warping that occurs before final assembly of the bipolar plate. Additionally, the prior approaches can result in increased material and/or assembly costs.

There is therefore a need for devices and processes which can achieve better flatness of an assembled bipolar plate and decrease the likelihood that the final bipolar plate includes bows or warps that impede fuel cell performance. Furthermore, there is a need for devices and processes that reduce manufacturing and material costs.

Figure 1:
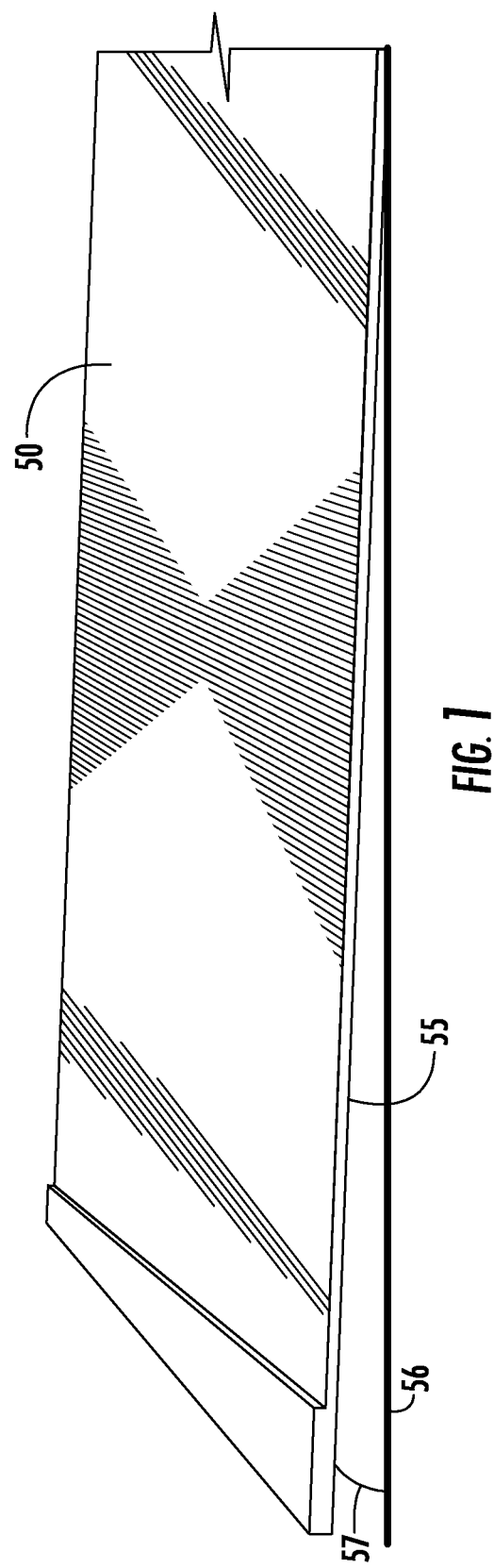
FIG. 1 is a side top perspective view of a warped bipolar plate.
Figure 2:
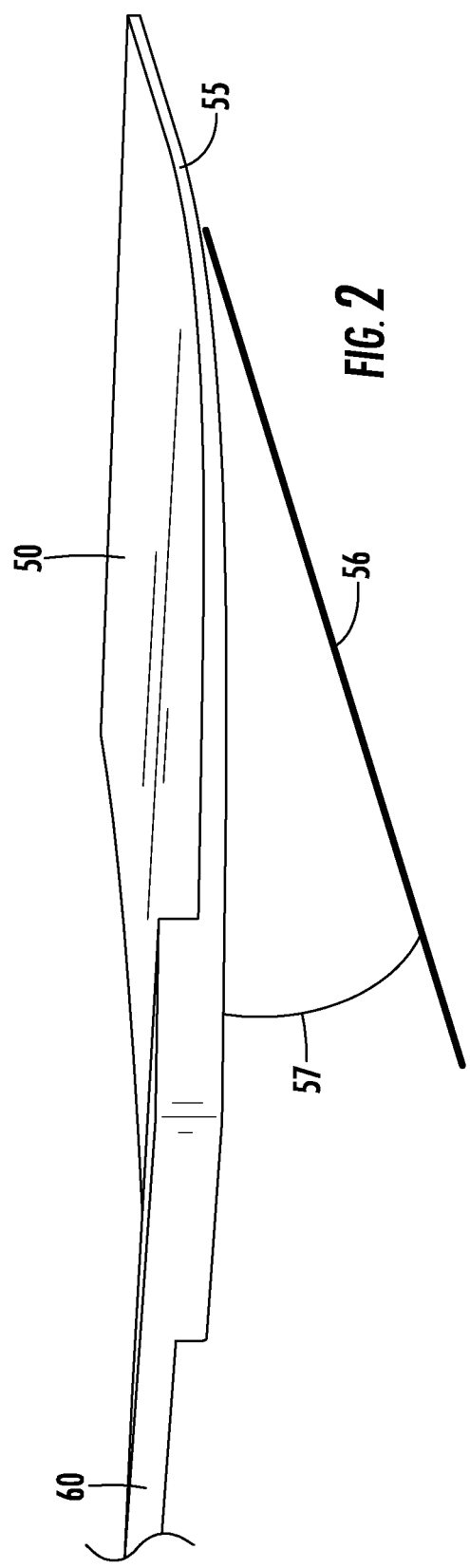
FIG. 2 is a side perspective showing the warped bipolar plate shown in FIG. 1.

FIGS. 1 and 2 show a warped bipolar plate 50. The bipolar plate includes edge 55 and edge 60. The warps and/or bends in the bipolar plate are evident relative to reference line 56, which is a straight line, parallel to the ground, extending along a length of the edge 55 of the bipolar plate 50. The warp and/or bend is measured in terms of a magnitude of angle 57 defined by line 56 and the edge 55 of the bipolar plate 50.

Referring generally to the FIGURES, the present disclosure relates to a shaping device, in particular an edge leveler 100 configured to flatten a bipolar plate for a fuel cell. The edge leveler 100 is useable to eliminate warps and/or bends of the bipolar plate, such as bipolar plate 50. The edge leveler 100 includes sets (e.g., banks, series, etc.) of rollers which are spaced in relation to each other in an offset configuration. The edge leveler 100 is adjustable such that a gap between different sets of offset rollers is adjustable based on a thickness of the bipolar plate 50. The present disclosure also relates to systems including the edge leveler 100 as described, as well as methods of using the edge leveler 100 disclosed herein. The edge leveler 100 as disclosed herein achieves a predetermined flatness in a bipolar plate which allows for desired material costs and manufacturing costs reductions. Furthermore, the edge leveler 100 ensures that a bipolar plate maintains the predetermined flatness when the bipolar plate is assembled in a fuel cell.

Figure 3:
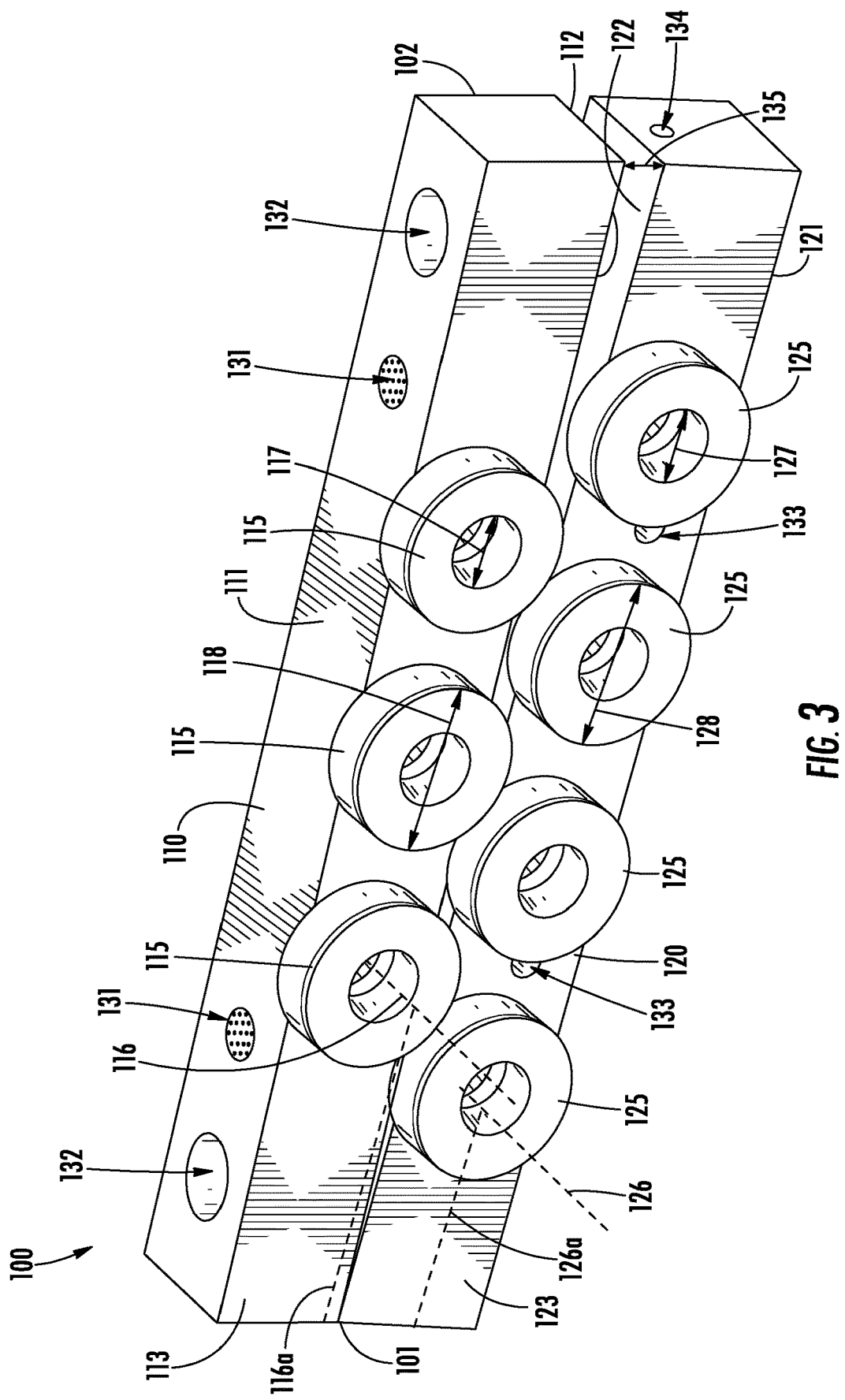
FIG. 3 is a side perspective of an edge leveler including offset rollers according to one exemplary embodiment of the present disclosure.
Figure 4:
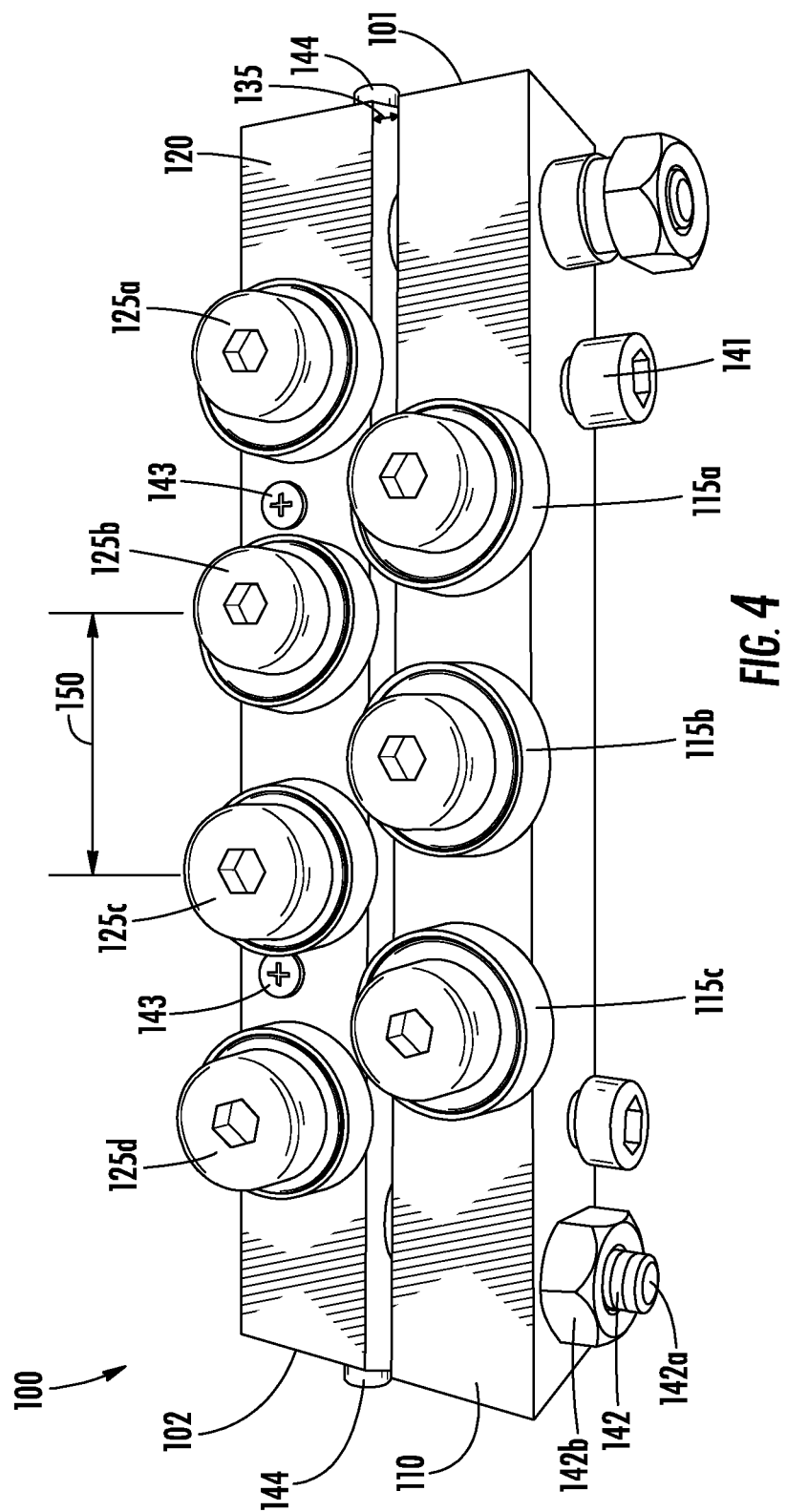
FIG. 4 is a side perspective view of the edge leveler including offset rollers shown in FIG. 3.

As shown in FIG. 3-4, an exemplary embodiment of an edge leveler 100 includes a first frame 110 and a second frame 120. The first frame 110 and the second frame 120 are formed of any suitable material. For example, the first frame 110 and the second frame 120 are formed of steel, such as stainless steel. Although a length of the first frame 100 and a length of the second frame 120 are shown to be the same in FIGS. 3-4, the edge leveler 100 is not particularly limited to this implementation. For example, the length of the second frame 120 may be longer than the length of the first frame 110. As an alternative example, the length of the first frame 110 may be longer than the length of the second frame 120.

The first frame 110 and the second frame 120 are securably coupled to each other using fasteners. For example, as shown in FIG. 3, the first frame 110 and the second frame 120 include fastener holes 132 which are configured to hold and/or house fasteners 142 (shown in FIG. 4). As shown in FIG. 4, the fasteners 142 are threaded bolts 142a secured by nuts 142b. The threaded bolts 142a have a suitable stiffness and/or firmness required to hold the first frame 110 and the second frame 120 together even when the edge leveler 100 is subject to loads caused when the bipolar plate 50 is run through the edge leveler 100. However, the edge leveler 100 is not particularly limited to this implementation. For example, the edge leveler 100 may include any suitable fasteners which may be used to securely couple the first frame 110 to the second frame 120. Additionally, although the first frame 110 and the second frame 120 are shown having two fastener holes 132, the first frame 110 and the second frame 120 may include any suitable number of fastener holes 132. For example, the number of fastener holes 132 may be one, two, three, four, five, six, or more.

The first frame 110 and the second frame 120 are configured to be separated by an adjustable gap 135, shown in FIG. 3. The adjustable gap 135 is configured to be adjustable based on a thickness of a bipolar plate (such as bipolar plate 50, shown in FIGS. 1-2) fed into the edge leveler 100. As shown in FIG. 3, the gap 135 may exist only at an end 102 of the edge leveler 100 but not at an end 101 of the edge leveler. In this implementation, the gap 135 exists only at the end 102 to facilitate progressively less bending of the edge 55 of the bipolar plate 50 as the edge 55 of the bipolar plate 50 is run through the edge leveler 100. However, the edge leveler 100 is not particularly limited to the implementation shown in FIG. 3. For example, FIG. 4 shows an edge leveler 100 with an adjustable gap 135 which extends along an entire length of the edge leveler 100, from the end 102 of the edge leveler 100 to the end 101 of the edge leveler 100.

The gap 135 is adjustable using set screws 141 and/or set screws 144 (shown in FIG. 4). The set screws 141 are mounted to the first frame 110 in set screw holes 131, shown in FIG. 3. The set screws 144 are mounted to the end 101 and/or the end 102 of the edge leveler in set screw holes 134, shown in FIG. 3. By adjusting the set screws 141 and/or the set screws 144, the gap 135 is adjustable to accommodate the thickness of the bipolar plate 50. The set screws 141 and 144 are any commercially available set screws. Although, as shown in FIG. 4, the number of set screws 141 is two and the number of set screws 144 is two, the edge leveler 100 is not particularly limited to this implementation. For example, the number of set screws 141 may be one, two, three, four, five, six, or more, and the number of set screws 144 may be one, two, three, four, five, six, or more. Although, as shown in FIGS. 3 and 4, the set screw holes 131 are provided in the first frame 110 and the set screw holes 134 are provided in the second frame 120, the edge leveler 100 is not particularly limited to this implementation. For example, the set screw holes 131 may be provided in the second frame 120 or in both the first frame 110 and the second frame 120, and the set screw holes 134 may be provided in the first frame 110 or in both the first frame 110 and the second frame 120.

As shown in FIG. 3, the second frame 120 also includes mounting holes 133 which are configured to hold and/or house fasteners 143 (shown in FIG. 4). The fasteners 143 are configured to mount the edge leveler 100 to an external device (such as a table) such that the edge leveler 100 is configured to be used in a stationary position. The fasteners 143 are any commercially available suitable fasteners; for example, mounting screws. Although, as shown in FIGS. 3 and 4, the mounting holes 133 are provided in the second frame 120, the edge leveler 100 is not particularly limited to this implementation. For example, the mounting holes 133 may be provided in the first frame 110 or in both the first frame 110 and the second frame 120.

As shown in FIGS. 3-4, the first frame 110 of the edge leveler 100 includes opposing surface 111 and opposing surface 112. The first frame 110 also includes a front surface 113 which is configured to support a plurality of rollers 115 (e.g., by rotatably mounting the plurality of rollers 115 along the front surface 113 of the first frame 110). According to one aspect, the plurality of rollers 115 are arranged in series in a straight line along a length of the first frame 110. The plurality of rollers 115 are rotatably mounted to the front surface 113 of the first frame 110. The plurality of rollers 115 are mounted only on one side of the first frame 110 (namely on the surface 113 of the first frame 110) such that the bipolar plate 50 is rolled into one side of the edge leveler 100. Each of the rollers 115 are configured to rotate about an axis of rotation 116. Each of the rollers 115 includes an inner diameter 117 and an outer diameter 118. The diameters 117 and 118 are sized based on a thickness of the bipolar plate 50 which is run through the edge leveler 100. According to some aspects, the plurality of rollers 115 are configured to be feed rollers. According to other aspects, the plurality of rollers 115 are configured to be idle rollers.

Still referring to FIGS. 3-4, the number of the plurality of rollers 115 shown is three, but the edge leveler 100 is not particularly limited to this implementation. For example, the number of the plurality of rollers 115 may be one, two, three, four, five, six, or more. The rollers 115 are any suitable rollers, such as commercially available rollers. The rollers 115 are made of any suitable material, for example stainless steel or plastic. Stainless steel rollers 115 provide for a longer operating life for the rollers 115, compared to plastic rollers 115. However, plastic rollers 115 minimize scratching of the bipolar plate 50 when the bipolar plate 50 is rolled by the rollers 115.

Referring to FIG. 4, according to one aspect, the gap between the roller 115a and the roller 125a (which are adjacent first and second rollers on a first end portion of the edge leveler 100 closest to the end 101) is greater than the gap between the roller 115b and roller 125b and/or roller 125c (which are adjacent first and second rollers on a middle portion of the edge leveler 100, between the ends 101 and 102). Accordingly, in this aspect, the gap between a set of rollers (e.g., roller 115a and roller 125a) on a first end of the edge leveler 100 is greater than a gap between rollers in a middle portion (e.g., roller 115b and roller 125b and/or roller 125c) of the edge leveler 100. According to another aspect, the gap between the roller 115c and the roller 125d (which are adjacent first and second rollers on a first end portion of the edge leveler 100 closest to the end 102) is greater than the gap between the roller 115b and roller 125b and/or roller 125c. Accordingly, in this aspect, the gap between a set of rollers (e.g., roller 115c and roller 125d) on a second end of the edge leveler 100 is greater than the gap between rollers in the middle portion (e.g., roller 115b and roller 125b and/or roller 125c) of the edge leveler 100. According to another aspect, the gap between the sets of rollers on both sides of the edge leveler 100 is greater than the gap between rollers in the middle portion of the edge leveler 100.

The second frame 120 of the edge leveler 100 includes opposing surface 121 and opposing surface 122. The second frame 120 also includes a front surface 123 which is configured to support a plurality of rollers 125 (e.g., by rotatably mounting the plurality of rollers 125 along the front surface 123 of the second frame 120). According to one aspect, the plurality of rollers 125 are arranged in series in a straight line along a length of the second frame 120. The plurality of rollers 125 are mounted only on one side of the first frame 120 (namely on the surface 123 of the first frame 120) such that the bipolar plate 50 is rolled into one side of the edge leveler 100. The second frame 120 is oriented relative to the first frame 110 such that the front surface 123 of the second frame 120 lies within a same plane as the front surface 113 of the first frame 110. In this configuration, the bipolar plate 50 can be rolled between the rollers 115 and the rollers 125.

Each of the plurality of rollers 125 are configured to rotate about an axis of rotation 126. Each of the rollers 125 includes an inner diameter 127 and an outer diameter 128. The diameters 127 and 128 are sized based on a thickness of the bipolar plate 50 which is run through the edge leveler 100. According to some aspects, the diameter 127 of each of the rollers 125 is of a same size as diameter 117 of each of the rollers 115. According to other aspects, the diameter 127 of each of the rollers 125 is of a different size as diameter 117 of each of the rollers 115. According to some aspects, the diameter 128 of each of the rollers 125 is of a same size as diameter 118 of each of the rollers 115. According to other aspects, the diameter 128 of each of the rollers 125 is of a different size as diameter 118 of each of the rollers 115. According to some aspects, the plurality of rollers 125 are configured to be feed rollers. According to other aspects, the plurality of rollers 125 are configured to be idle rollers.

As shown in FIGS. 3-4, the number of the plurality of rollers 125 shown is four, but the edge leveler 100 is not particularly limited to this implementation. For example, the number of the plurality of rollers 125 may be one, two, three, four, five, six, seven, eight or more. According to one aspect, the number of rollers 125 is one more than the number of rollers 115. The rollers 125 are any suitable rollers, such as commercially available rollers. The rollers 125 are made of any suitable material, for example stainless steel or plastic. Stainless steel rollers 125 provide for a longer operating life for the rollers 125, compared to plastic rollers 125. However, plastic rollers 125 minimize scratching of the bipolar plate 50 when the bipolar plate 50 is rolled by the rollers 125.

The axes of rotation 126 of each of the rollers 125 is offset from the axes of rotation 116 of each of the rollers 115. For any given roller 125, a distance 126a from the end 101 of the edge leveler 100 to the axis of rotation 126 of the roller 125 is different than a distance 116a from the end 101 of the edge leveler 100 to the axis of rotation 116 of a roller 115 which is immediately adjacent to the roller 125. The distance between one roller 115 and one roller 125 is shown as distance 150. According to one aspect, the difference between the distance 126a and the distance 116a is a function of the outer diameter 118 of the roller 115 and/or the outer diameter 128 of the roller 125. For example, the difference between the distance 126a and the distance 116a is equal to about half of the diameter 117 and/or diameter 118.

Figure 11:
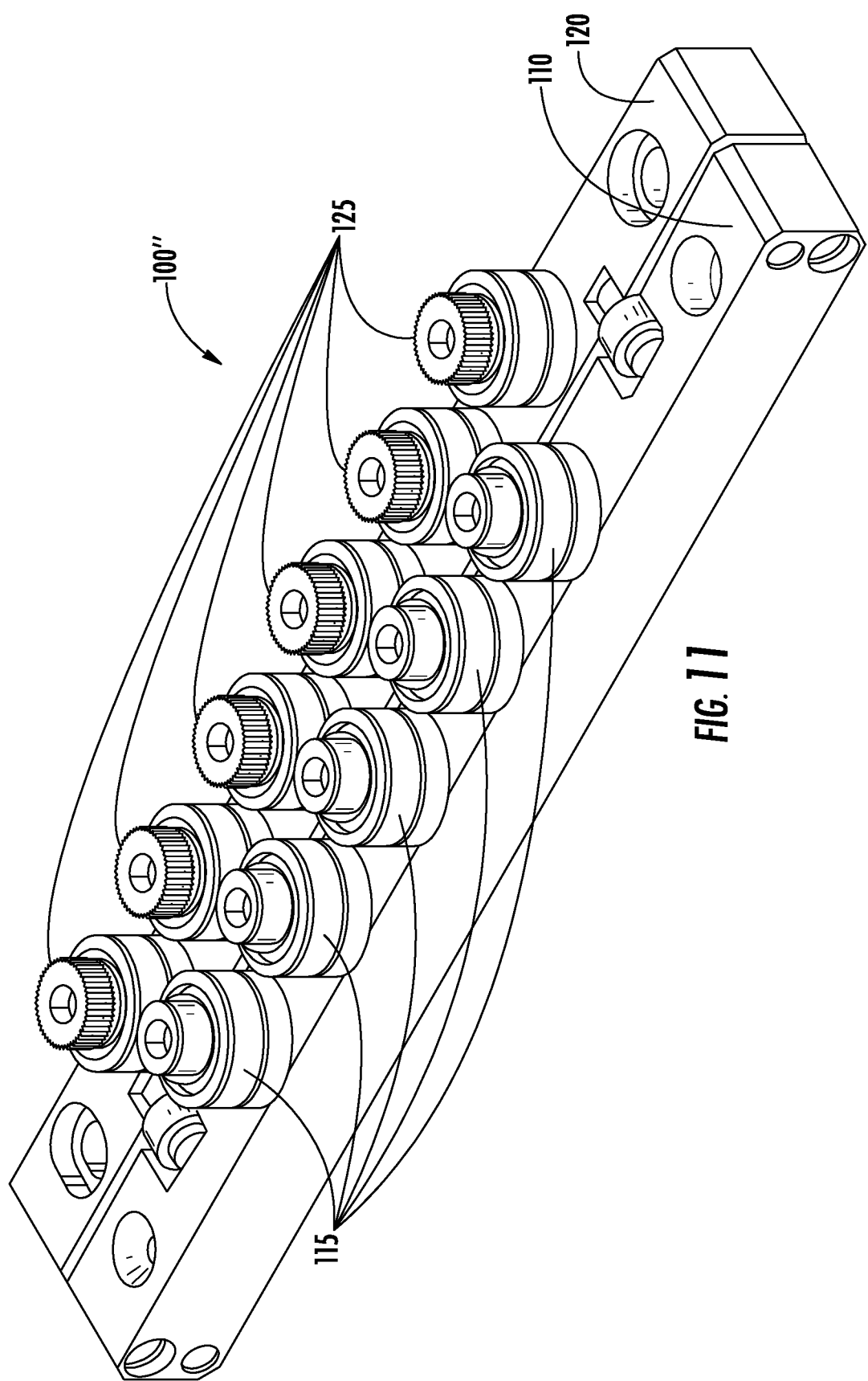
FIG. 11 is an example of an edge leveler having eleven rollers.

In FIGS. 3-4, a total number of rollers (rollers 115, 125) is seven. However, the edge leveler 100 is not limited to this implementation. In another example, as shown in FIG. 11, an edge leveler 100" may include eleven rollers (rollers 115, 125). In each of the examples, a number of rollers 115 on the first frame 110 is different from the number of rollers 125 on the second frame 120. However, the edge levelers 100, 100" are not limited to this implementation. In some examples, there may be an equal number of rollers 115 and rollers 125. In other examples, there may be more rollers 125 than rollers 115. In even further examples, there may be more rollers 115 than rollers 125.

Figure 12:
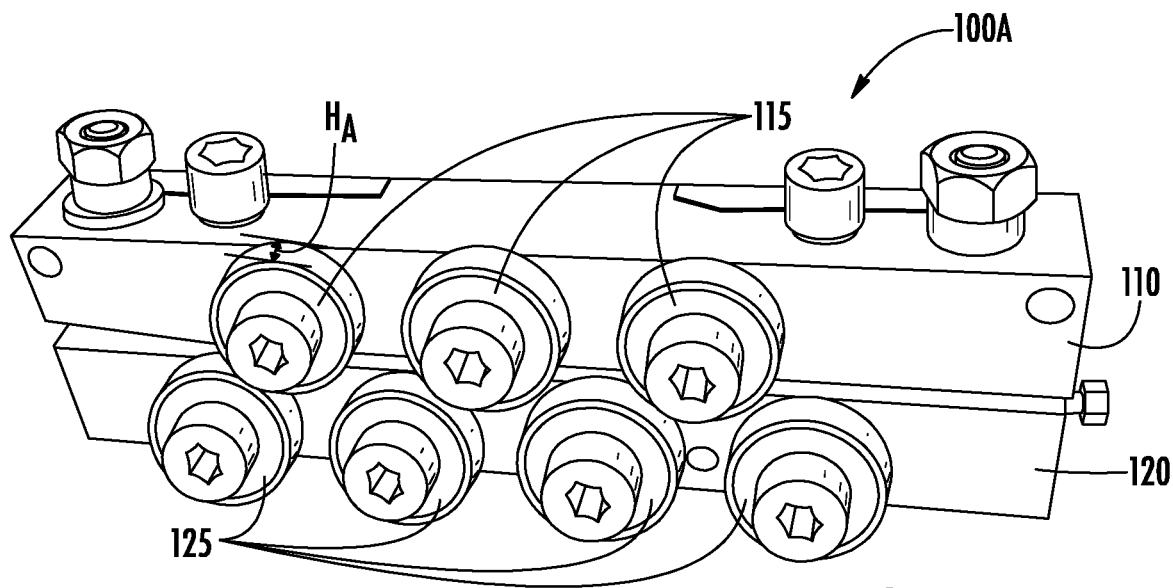
FIGS. 12-14 illustrate examples of various configurations of rollers that may be used in an edge leveler, where the rollers have different shapes, sizes, and heights with respect to a frame of the edge leveler.
Figure 13:
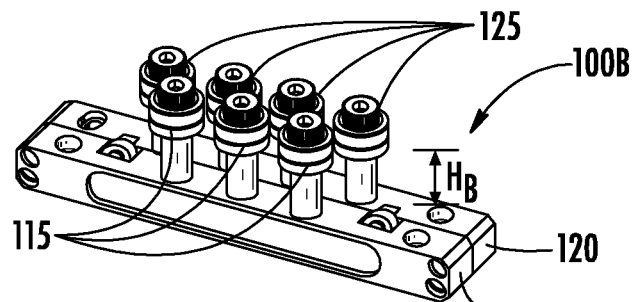
Figure 14:
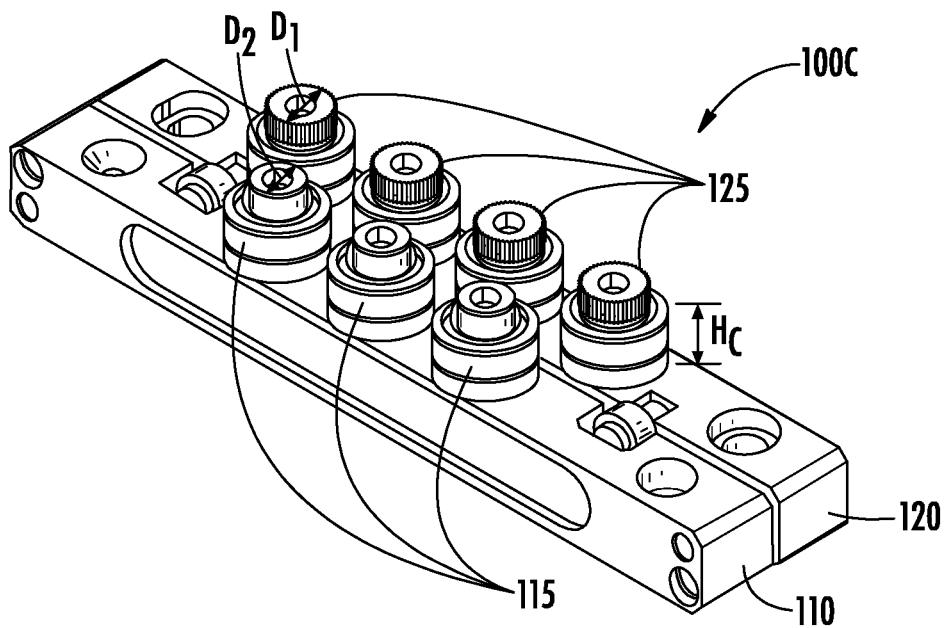

FIGS. 12-14 illustrate different examples of an edge leveler (i.e., edge leveler 100A shown in FIG. 12, edge leveler 100B shown in FIG. 13, and edge leveler 100C shown in FIG. 14). As shown in FIGS. 12-14, the rollers (e.g., the rollers 115, 125) of the edge levelers can be any shape (e.g., the rollers 115, 125 may have different diameters $D_1$ and $D_2$, as shown in FIG. 14, etc.) and may be mounted higher or lower (i.e., further or closer) to a respective first frame 110 or second frame 120 to accommodate different objects having varying shapes and sizes, while still directing de-stressing forces to the object. For example, the rollers 115, 125 of edge leveler 100B are disposed at a height HB above the respective first frame 110 and second frame 120 that is higher than the relative heights HA and Hc of rollers 115, 125 on edge levelers 100A and 100C, respectively.

In some aspects, a plurality of edge levelers 100 may be provided in series.

Figure 9:
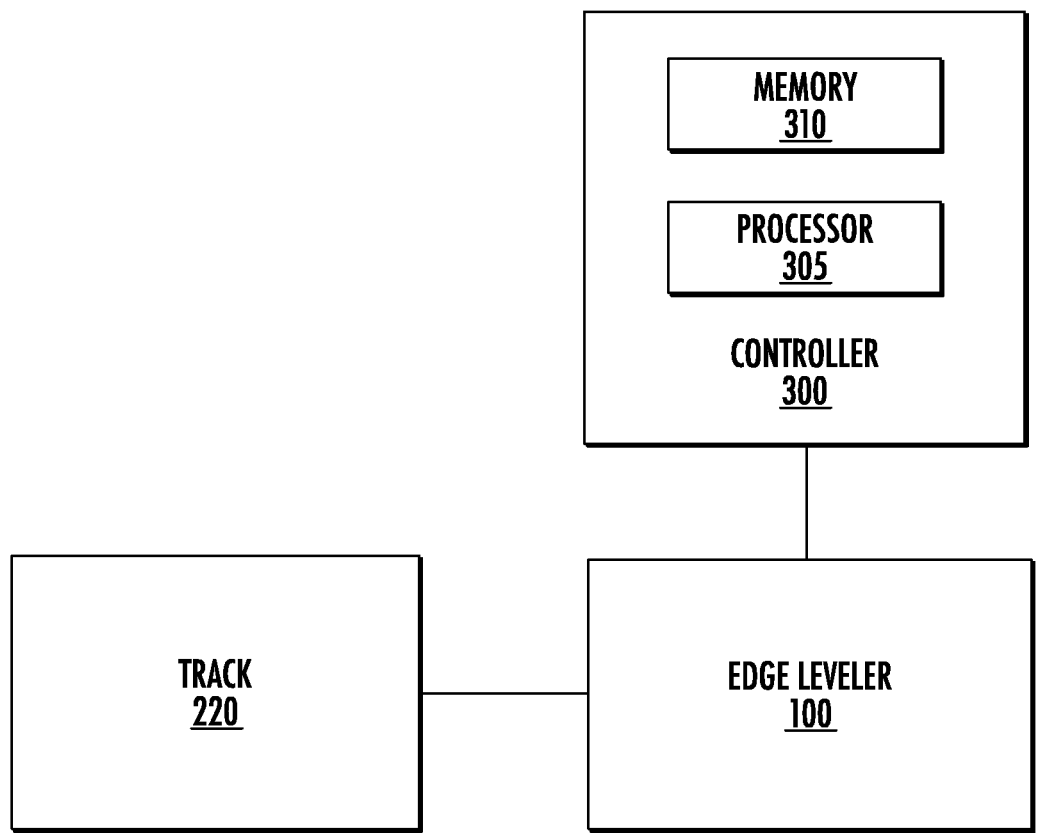
FIG. 9 is a block diagram illustrating a system for leveling edges of a plate, according to another exemplary embodiment of the present disclosure.

According to some aspects, the edge leveler 100 is operated manually. According to other aspects, the edge leveler 100 is operated in an automatic configuration and is configured to operate and/or move in an automatic configuration. For example, when the edge leveler 100 is operated in an automatic configuration, the edge leveler 100 is mounted to a track, such as track 220 (described below) and the edge leveler 100 is connected, using any suitable connection (e.g., mechanical, electrical, etc.) to a controller 300, as shown in FIG. 9. According to one aspect, the controller 300 includes a memory 310 and a processor 305. According to some aspects, the controller 300 is configured to control a speed and/or direction of the rotational movement of the rollers 115 and/or the rollers 125. According to other aspects, such as the case in which the edge leveler 100 is mounted on a track (as described below with reference to the edge leveler 100'), the controller 300 is configured to automatically control a movement of the edge leveler 100 or the edge leveler 100' along a length of the track (such as along the length of the track 220 described below). In examples including such an automatic control, the whole frame may be pushed with a linear drive system (e.g., an air cylinder, a ball screw, etc.). However, the rollers may remain free spinning (i.e., are not driven).

Figure 5:
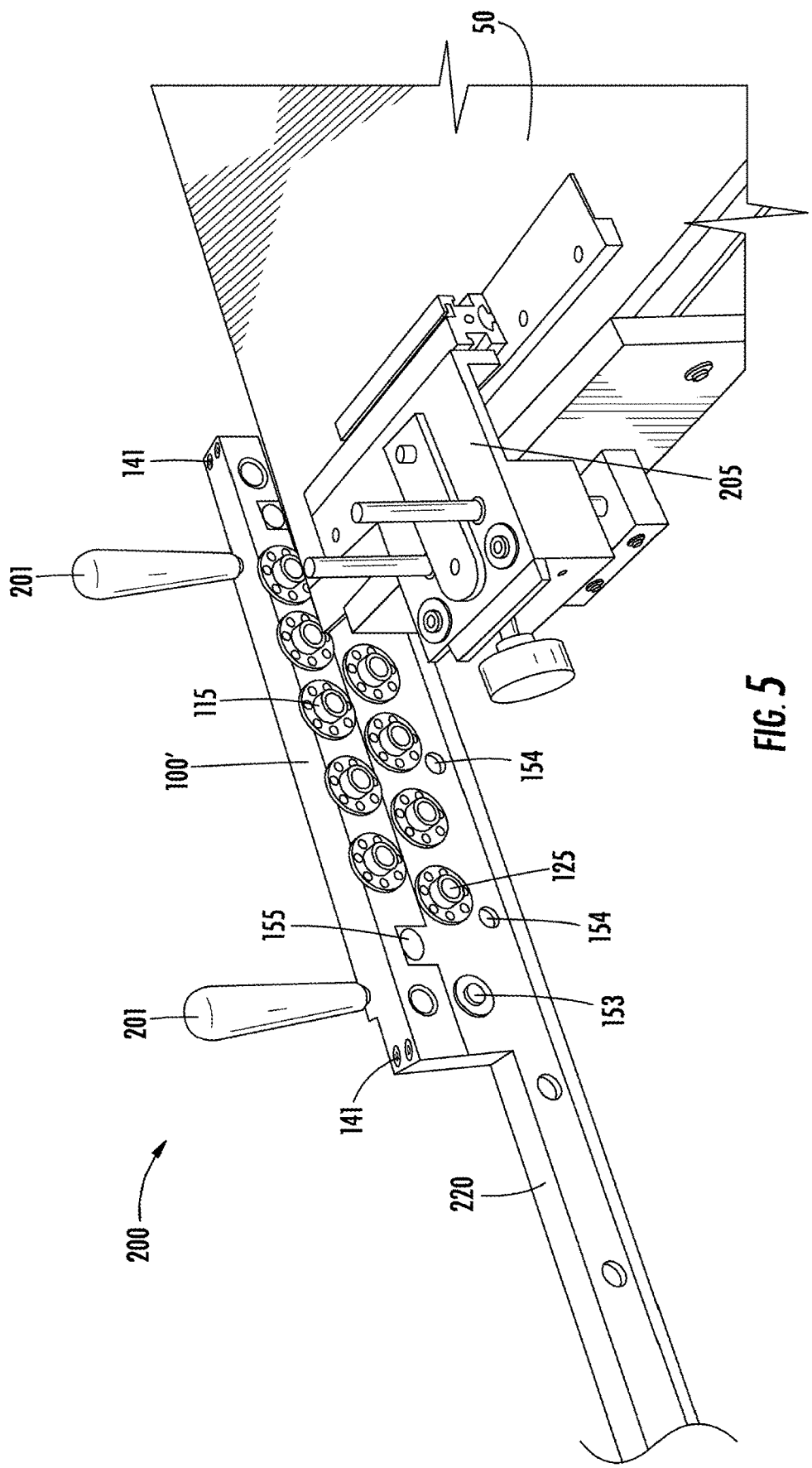
FIG. 5 is a side perspective view of a system for leveling edges of a plate including an edge leveler including offset rollers, according to another exemplary embodiment of the present disclosure.
Figure 6:
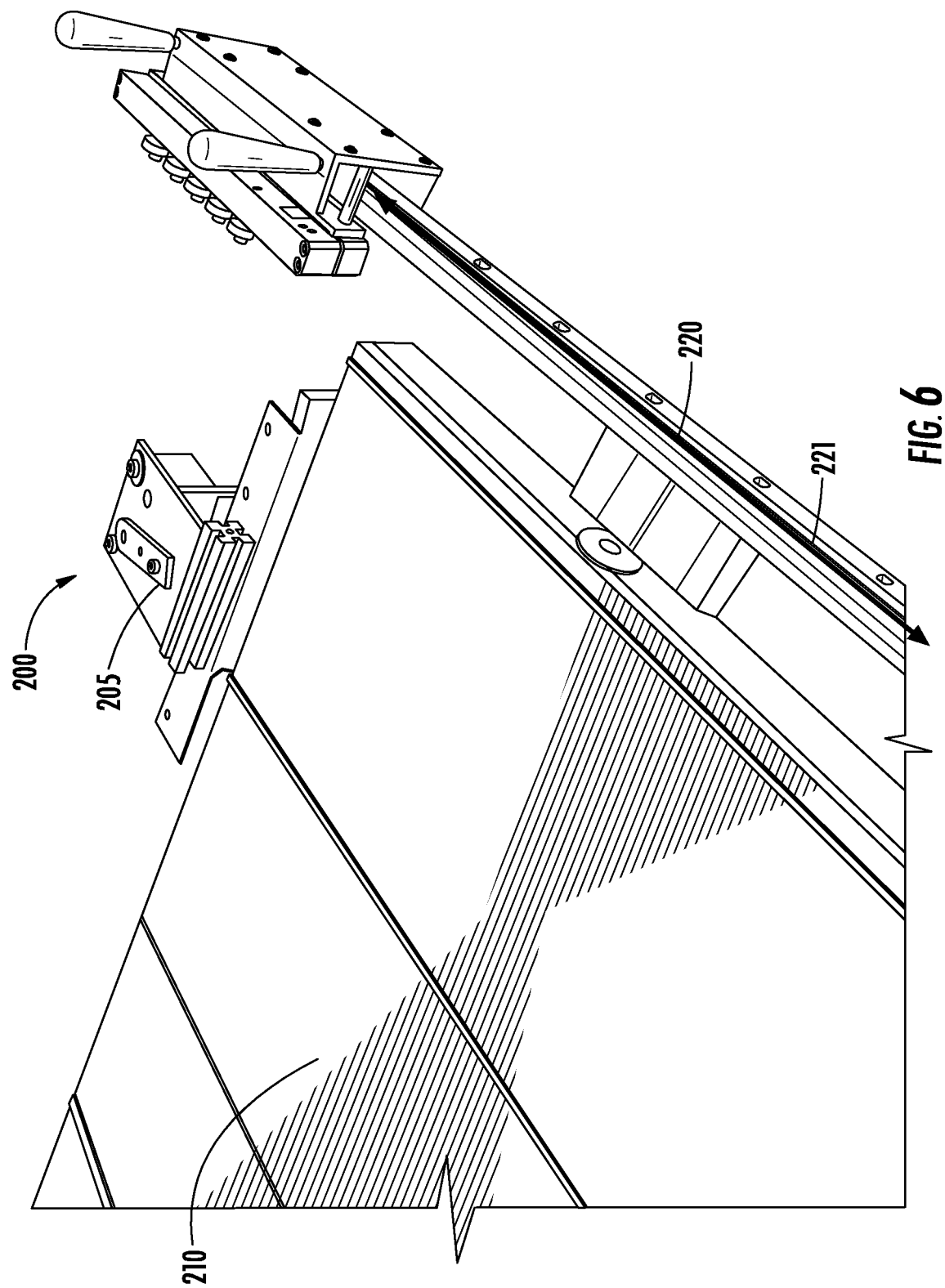
FIG. 6 is front perspective view of the system shown in FIG. 5.

Referring now to FIGS. 5-6, according to one embodiment of the present disclosure, an edge leveling system 200 is shown. The system 200 includes a table 210 on which a bipolar plate 50 to be flattened is placed. The system 200 also includes a vice 205 which is configured to hold the bipolar plate 50 in place on the table 210. The system also includes a track 220 on which the edge leveler 100' is mountable. When mounted on the track 220, the edge leveler 100' may be stationary or slidable (i.e., configured to translate). Although in the example of FIG. 6, the system 200 is only provided at one side of the table 210, the system 200 is not limited to this implementation. For example, a plurality of systems 200 (e.g., two, three, four, etc.) may be provided at a plurality of sides of the table 210 (e.g., one system on each side of the table 210, one system provided at each of two opposing sides of the table 210, two systems provided on one side of the table 210, etc.).

The system 200 includes an edge leveler 100', which is the same as the edge leveler 100 described above, except for any differences herein described. The edge leveler 100' shown in FIGS. 5-6 includes five rollers 115 and six rollers 125. The edge leveler 100' also includes four set screws 141, two each disposed on opposing ends of the edge levelers 100'. The four set screws 141 are configured to adjust a gap between the rollers 115 and the rollers 125. The edge leveler 100' also includes fastener 153 which is configured to mount the edge leveler 100' to the track 220. In particular, the fastener 153 may be configured to attach the frame of the edge leveler 100' to a carriage on the track 220. The edge leveler 100' also includes elements mounting holes 154 (which may not be used in this configuration) and a horizontal mounted roller 155. The horizontal mounted roller 155 may be used as a guide to prevent the edge of the bipolar plate from moving too far into the edge leveler rollers 115,125 and causing damage to the wet seals (part of the bipolar plate assembly).

The edge leveler 100' is configured to be mounted onto a track 220 such that the edge leveler 100' moves along the track 220 in a line 221 along a length of the track 220. This configuration of the track 220 allows the edge leveler 100' to be run in two directions along the line 221 along an edge (such as edge 55) of the bipolar plate 50. Handles 201 which are mounted to the edge leveler 100' allow a user to move the edge leveler 100' along the track 220.

Figure 7:
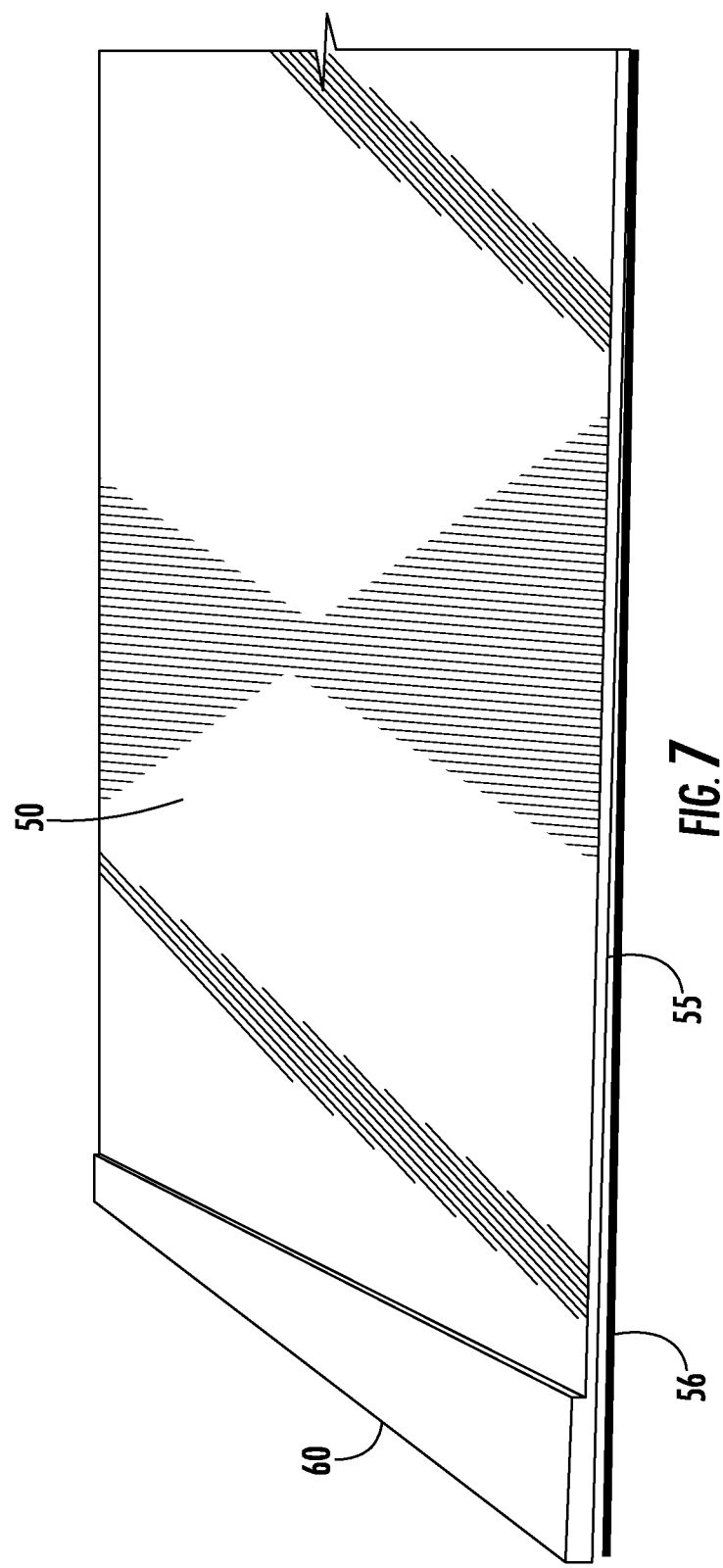
FIG. 7 is a side top perspective view of a flattened bipolar plate.
Figure 8:
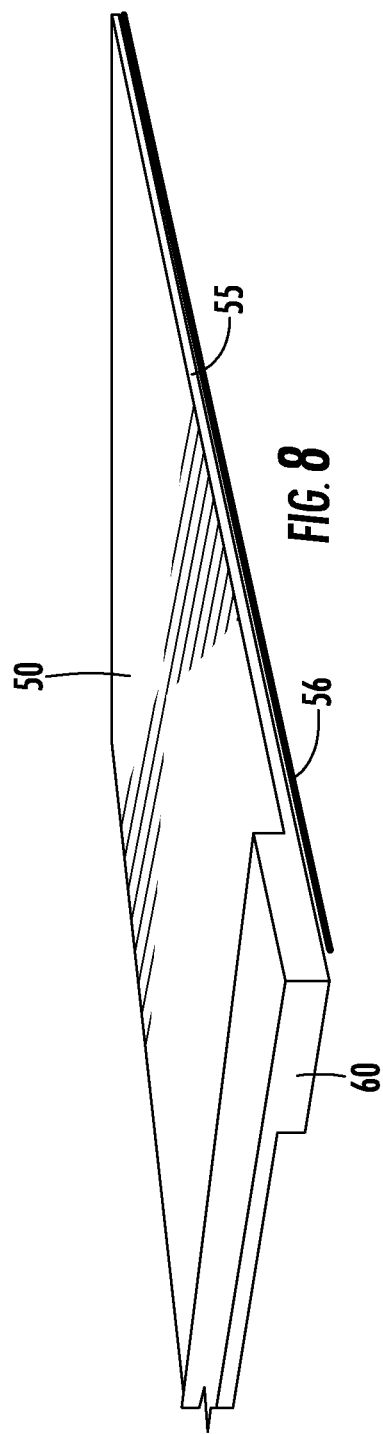
FIG. 8 is a side perspective showing the flattened bipolar plate shown in FIG. 7.

Referring to FIGS. 7-8, a flattened bipolar plate 50 is shown after the bipolar plate 50 is rolled through the edge leveler 100 or the edge leveler 100' as described herein. As shown in FIGS. 7-8, the bipolar plate 50 includes flattened edge 55 which has been flattened to a predetermined flatness. The predetermined flatness may be, for example, less than ¼" of displacement of the leveled edge. In other examples, the predetermined flatness may be measured in terms of the angle between the line 56 and the edge 55. For example, the edge 55 of the bipolar plate has been flattened so that the angle between line 56 and the edge 55 is zero.

Another exemplary embodiment of the present disclosure relates to a method of shaping a bipolar plate for a fuel cell. As shown in FIG. 10, the method 1100 of shaping a bipolar plate for a fuel cell includes the step 1101 of providing an edge leveler, such as the edge leveler 100 or the edge leveler 100', both described herein. The edge leveler includes a first frame; a plurality of first rollers rotatably mounted along the first frame; a second frame; and a plurality of second rollers rotatably mounted along the second frame; and leveling an edge of the bipolar plate using the edge leveler. The second rollers are offset relative to the first rollers. A width of a gap between an adjacent pair of first and second rollers on a first end portion of the edge leveler is greater than a width of a gap between an adjacent pair of first and second rollers in a middle portion of the edge leveler. The method 1100 also includes step 1103 of leveling an edge of the bipolar plate using the edge leveler. The method 1100 may also include the step of flattening the plate to a predetermined flatness.

According to one aspect of the method 1100, a width of a gap between an adjacent pair of first and second rollers on a second end portion of the edge leveler is greater than the width of the gap between the adjacent pair of first and second rollers in the middle portion of the edge leveler. According to another aspect of the method 1100, the width of the gap between the adjacent pair of first and second rollers on the second end portion of the edge leveler is adjustable. According to another aspect of the method 1100, the width of the gap between the adjacent pair of first and second rollers on the second end portion of the edge leveler is adjustable via a set screw. According to another aspect of the method 1100, the width of the gap between the adjacent pair of first and second rollers on the first end portion of the edge leveler is adjustable. According to another aspect of the method 1100, the width of the gap between the adjacent pair of first and second rollers on the first end portion of the edge leveler is adjustable via a set screw. According to another aspect of the method 1100, the edge leveler is configured to be mounted on a track, such as the track 220 described herein. According to another aspect of the method 1100, the edge leveler is configured to be automatically moveable along a length of the track. A movement of the edge leveler along the length of the track is controllable by a controller, such as the controller 300 herein described.

Any of the edge levelers described above may be used to create a camber-free wet seal (e.g., an edge component that overlaps/seals an interface of two pieces, for example, two solid planar pieces). For example, an edge leveler may receive a cambered stamped part or wet seal. The rollers of the edge levelers relax the internal differential stretched metal stresses, thereby straightening out the cambered stamped part or resulting in a camber-free wet seal.

The edge levelers described above are tools used to remove and/or straighten the bow in bipolar plates used in fuel cell stack assemblies by using a series of opposing offset interfering roller bearings at an adjustable angle and engagement depth. The edge levelers gradually bend the bowed edges of the bipolar plates straight. The edge levelers are specifically designed to allow a set of opposing offset interfering rollers to run over and manipulate the welded edge wing portion of the bipolar plate and straighten the stamped in stress and induced weld warp in the bipolar plate edge. The offset rollers are only mounted on one side, leaving the other side open. This configuration allows two sets of rollers to run along both sides of the stationary bipolar plate at the same time. The edge levelers are also configured to adjust the gap interference and taper of the rollers to adjust the edge levelers to take the cambered stress out of the warped parts and to achieve the desired flatness of the bipolar plate welded assembly and wing. In particular, the edge levelers may be adjustable for taper and for gap setting to be able to accommodate any bow amount that results from the bipolar plate edge welding assembly process As discussed above, the edge leveler can be used by hand or in various automated configurations. In one example, an edge leveler system includes a track-mounted, linear cylinder driven, offset roller bearing set edge leveler that eliminates ergonomic issues and variable quality that may result from hand operation (manual operation).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the edge leveler with offset rollers as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present disclosure. For example, any element (e.g., the offset rollers, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. An edge leveler for leveling an edge of a plate, the edge leveler comprising:
   a first frame;
   a plurality of first rollers rotatably mounted along the first frame;
   a second frame; and
   a plurality of second rollers rotatably mounted along the second frame;
   wherein the plurality of second rollers are offset relative to the first rollers;
   wherein a width of a gap between an adjacent pair of first and second rollers on a first end portion of the edge leveler is greater than a width of a gap between an adjacent pair of first and second rollers in a middle portion of the edge leveler; and
   wherein the plurality of first rollers and the plurality of second rollers are configured to receive only a first edge of the plate therebetween to straighten the first edge of the plate relative to the rest of the plate;
   and wherein the edge leveler is configured to slidably couple to a track and to slide along the track to level the first edge of the plate while the plate is stationary.

2. The edge leveler according to claim 1, wherein a width of a gap between an adjacent pair of first and second rollers on a second end portion of the edge leveler is greater than the width of the gap between the adjacent pair of first and second rollers in the middle portion of the edge leveler.

3. The edge leveler according to claim 2, wherein the width of the gap between the adjacent pair of first and second rollers on the second end portion of the edge leveler is adjustable.

4. The edge leveler according to claim 3, wherein the width of the gap between the adjacent pair of first and second rollers on the second end portion of the edge leveler is adjustable via a set screw.

5. The edge leveler according to claim 1, wherein the width of the gap between the adjacent pair of first and second rollers on the first end portion of the edge leveler is adjustable.

6. The edge leveler according to claim 5, wherein the width of the gap between the adjacent pair of first and second rollers on the first end portion of the edge leveler is adjustable via a set screw.

7. The edge leveler according to claim 1, wherein a rotational speed of at least one of the first rollers or the second rollers is controllable by a controller.

8. The edge leveler of claim 1, further comprising a plurality of handles configured to allow a user to move the edge leveler along the track.

9. A system for leveling an edge of a stationary plate, the system comprising:
   a track; and
   an edge leveler slidably coupled to the track, the edge leveler comprising:
     a first frame;
     a plurality of first rollers rotatably mounted along the first frame;
     a second frame; and
     a plurality of second rollers rotatably mounted along the second frame; and
     a vertically mounted roller arranged perpendicularly to the plurality of first rollers;
     wherein the edge leveler is configured to slide along the track to level one edge of the stationary plate, and the plurality of first rollers and the plurality of second rollers are configured to receive one edge of the plate therebetween while an opposite edge of the plate is not received therebetween, with the vertically mounted roller acting to prevent the one edge of the plate from moving too far into the plurality of first and second rollers;
     wherein the second rollers are offset relative to the first rollers; and
     wherein a width of a gap between an adjacent pair of first and second rollers on a first end portion of the edge leveler is greater than a width of a gap between an adjacent pair of first and second rollers in a middle portion of the edge leveler.

10. The system according to claim 9, wherein a width of a gap between an adjacent pair of first and second rollers on a second end portion of the edge leveler is greater than the width of the gap between the adjacent pair of first and second rollers in the middle portion of the edge leveler.

11. The system according to claim 10, wherein the width of the gap between the adjacent pair of first and second rollers on the second end portion of the edge leveler is adjustable.

12. The system according to claim 11, wherein the width of the gap between the adjacent pair of first and second rollers on the second end portion of the edge leveler is adjustable via a set screw.

13. The system according to claim 9, wherein the width of the gap between the adjacent pair of first and second rollers on the first end portion of the edge leveler is adjustable.

14. A method of shaping a bipolar plate for a fuel cell, the method comprising:
- providing an edge leveler comprising:
  - a first frame coupled to a track;
  - a plurality of first rollers rotatably mounted along the first frame;
  - a second frame; and
  - a plurality of second rollers rotatably mounted along the second frame;
  - wherein the second rollers are offset relative to the first rollers;
  - wherein a width of a gap between an adjacent pair of first and second rollers on a first end portion of the edge leveler is greater than a width of a gap between an adjacent pair of first and second rollers in a middle portion of the edge leveler; and
  - wherein the plurality of first rollers and the plurality of second rollers are configured to receive only a first edge of the bipolar plate therebetween; and
- sliding the edge leveler along the track to level the first edge of the bipolar plate relative to the rest of the plate while the plate is stationary.

15. The method according to claim 14, wherein a width of a gap between an adjacent pair of first and second rollers on a second end portion of the edge leveler is greater than the width of the gap between the adjacent pair of first and second rollers in the middle portion of the edge leveler.

16. The method according to claim 15, wherein the width of the gap between the adjacent pair of first and second rollers on the second end portion of the edge leveler is adjustable.

17. The method according to claim 14, wherein the width of the gap between the adjacent pair of first and second rollers on the first end portion of the edge leveler is adjustable.

18. The method according to claim 17, wherein the width of the gap between the adjacent pair of first and second rollers on the first end portion of the edge leveler is adjustable via a set screw.

19. The method according to claim 14, wherein the edge leveler is controlled by a controller to be automatically moved along a length of the track during the step of leveling the first edge of the bipolar plate.

* * * * *